US00RE44742E

(19) United States
(12) Reissued Patent
Mäkelä

(10) Patent Number: US RE44,742 E
(45) Date of Reissued Patent: Feb. 4, 2014

(54) DYNAMIC MESSAGE TEMPLATES AND MESSAGING MACROS

(75) Inventor: Kaj Mäkelä, Helsinki (FI)

(73) Assignee: Sulvanuss Capital L.L.C., Wilmington, DE (US)

(21) Appl. No.: 13/542,351

(22) Filed: Jul. 5, 2012

Related U.S. Patent Documents

Reissue of:
(64) Patent No.: 7,751,533
Issued: Jul. 6, 2010
Appl. No.: 11/120,169
Filed: May 2, 2005

(51) Int. Cl.
*H04M 1/64* (2006.01)
*H04L 12/56* (2011.01)
*G06F 15/16* (2006.01)
*G06Q 10/00* (2012.01)

(52) U.S. Cl.
USPC ..... 379/88.12; 239/63; 342/357.39; 370/312; 370/389; 370/315; 370/473; 379/88.13; 379/88.23; 379/88.22; 379/93.24; 386/241; 455/407; 455/412.2; 455/418; 455/456.6; 455/574; 701/300; 75/35; 75/26.4; 75/14.66; 709/206; 709/217; 709/218; 709/220; 715/752; 715/200; 715/205; 725/114; 726/27

(58) Field of Classification Search
USPC ..... 239/63; 342/357.39; 370/312, 389, 315, 370/473; 379/88.12, 88.13, 88.22, 88.23, 379/93.24; 386/241; 455/407, 412.2, 418, 455/456.6, 574, 41.2, 412.1, 414.4, 419, 455/466; 701/300; 705/35, 14.66, 26.4; 709/206, 217, 218, 220; 715/752, 200, 715/205; 704/251; 707/5, 6; 725/114; 726/27
See application file for complete search history.

(56) References Cited

U.S. PATENT DOCUMENTS

| | | | | |
|---|---|---|---|---|
| 5,495,553 | A * | 2/1996 | Jakatdar | 704/251 |
| 5,557,723 | A | 9/1996 | Holt et al. | |
| 5,579,467 | A | 11/1996 | Capps | |
| 5,861,841 | A | 1/1999 | Gildea et al. | |
| 5,905,863 | A | 5/1999 | Knowles et al. | |
| 5,999,808 | A | 12/1999 | LaDue | |

(Continued)

FOREIGN PATENT DOCUMENTS

| | | |
|---|---|---|
| WO | 9946701 | 9/1999 |
| WO | 0248824 | 6/2002 |

OTHER PUBLICATIONS

International Search Report from PCT Application No. PCT/IB2006/001102; Aug. 18, 2006; 12 Pages.

(Continued)

*Primary Examiner* — Gerald Gauthier
(74) *Attorney, Agent, or Firm* — Stolowitz Ford Cowger LLP

(57) ABSTRACT

A device and method provide a user with a template for a message having fields that can be pre-filled with data to reduce the manual entry of data into the message. The method includes, but is not limited to, executing an application at a device, wherein context data including context data items is associated with the executing application, selecting a messaging technology to send a message from the device, selecting a template for the message, wherein the template comprises one or more dynamic fields, selecting a context data item from the context data associated with the executing application, and inserting the selected context data item in the dynamic field to facilitate the creation of a message.

40 Claims, 9 Drawing Sheets

(56) References Cited

U.S. PATENT DOCUMENTS 6,085,201 A 7/2000 Tso
6,101,486 A * 8/2000 Roberts et al. ..... 705/14.66
6,662,340 B2 12/2003 Rawat et al.
6,718,368 B1 4/2004 Ayyadurai
6,728,708 B1 4/2004 Yotka et al.
6,751,657 B1 * 6/2004 Zothner ..... 709/220
6,782,081 B2 8/2004 Malik
6,877,675 B2 4/2005 Benneweis
7,073,055 B1 7/2006 Freed et al.
7,123,816 B2 10/2006 McGrath et al.
7,139,252 B2 11/2006 Babu et al.
7,200,387 B1 4/2007 Ephraim et al.
7,209,951 B2 4/2007 Goldberg
7,212,808 B2 5/2007 Engstrom et al.
7,274,909 B2 9/2007 Perttila et al.
7,293,074 B1 11/2007 Jellinek et al.
7,313,421 B2 12/2007 Dejanovic et al.
7,315,613 B2 * 1/2008 Kleindienst et al. ..... 379/88.13
7,321,921 B2 1/2008 Malik
7,333,804 B2 2/2008 Kim
7,363,247 B1 * 4/2008 Barnhill et al. ..... 705/26.4
7,380,212 B2 * 5/2008 Cody et al. ..... 715/752
7,386,396 B2 6/2008 Johnson
7,392,289 B2 6/2008 Curry et al.
7,487,456 B2 2/2009 Brooke et al.
7,546,298 B2 * 6/2009 Hulaj et al. ..... 1/1
7,580,406 B2 * 8/2009 Shah et al. ..... 370/389
7,690,043 B2 * 3/2010 Saunders et al. ..... 726/27
7,751,533 B2 * 7/2010 Makela ..... 379/88.12
7,848,740 B2 * 12/2010 Hyyppa et al. ..... 455/419
7,925,983 B2 * 4/2011 Bangor et al. ..... 715/752
8,001,192 B1 * 8/2011 Papineau et al. ..... 709/206
2002/0194280 A1 * 12/2002 Altavilla et al. ..... 709/206
2003/0105760 A1 6/2003 Sini
2004/0087273 A1 5/2004 Perttila et al.
2004/0107401 A1 6/2004 Sung et al.
2004/0243688 A1 12/2004 Wugofski
2005/0039112 A1 2/2005 Kim
2005/0060381 A1 3/2005 Huynh et al.
2005/0163065 A1 7/2005 Yule
2006/0058048 A1 3/2006 Kapoor et al.
2006/0128408 A1 6/2006 Perttila et al.
2006/0146814 A1 * 7/2006 Shah et al. ..... 370/389
2006/0168057 A1 7/2006 Warren et al.
2006/0203849 A1 9/2006 Bonar et al.
2006/0245555 A1 * 11/2006 Makela ..... 379/88.12
2007/0123278 A1 5/2007 Swerup et al.
2007/0140439 A1 6/2007 Olrik et al.
2008/0155633 A1 6/2008 Watson
2008/0222127 A1 9/2008 Bergin

OTHER PUBLICATIONS

International Search Report from PCT Application No. PCT/IB2006/001102.

* cited by examiner

DYNAMIC MESSAGE TEMPLATES AND MESSAGING MACROS

Matter enclosed in heavy brackets [ ] appears in the original patent but forms no part of this reissue specification; matter printed in italics indicates the additions made by reissue.

*RELATED APPLICATIONS*

*This application is a reissue of and claims priority to U.S. patent application Ser. No. 11/120,169, filed May 2, 2005, issued as U.S. Pat. No. 7,751,533, all of which is incorporated herein in its entirety.*

FIELD OF THE INVENTION

The present invention is related to electronic messaging. More specifically, the present invention relates to dynamic message templates and messaging macros that facilitate the creation of electronic messages.

BACKGROUND OF THE INVENTION

Mobile device communication capabilities, in addition to supporting voice conversations with other phones, now increasingly include a variety of text messaging technologies some of them previously available in personal computers (PCs). Text messaging technologies include e-mail, Instant Messaging (IM), facsimile, short messaging, and multimedia messaging. The Short Messaging Service (SMS) is a store and forward method of transmitting short messages to and from mobiles devices. SMS can also be used to transmit e-mail and IM messages though further forwarding and/or message converting may be required. The Multimedia Messaging Service (MMS) transmits messages to and from mobile communication devices in a store-and-retrieve manner, but MMS allows a combination of text, sounds, images, and video.

Although e-mail, SMS, MMS, and push e-mail are store-and-forward or store-and-retrieve systems that utilize a gateway to pass messages from senders to recipients, there are differences between these text messaging technologies. The most obvious difference is the length and the complexity of the messages. E-mail allows the attachment of files, the embedding of images, and allows the use of HTML. SMS messages are generally short text based messages. A user, however, can send a business card that includes an image of the person where the image data is translated into text data for example using base64 conversion. MMS messages allow sounds, images, and video in addition to text. Additionally, SMS messages are delivered directly to the device; whereas, e-mail may nut be immediately delivered directly to the device, but may be stored in mail servers and sent either periodically or fetched by a user's client application when the user logs onto the e-mail system. Through push e-mail, e-mail messages that have been received by a desktop or server mail system are automatically transmitted to a PDA, laptop, or other portable device to keep mobile users up-to-date. Push e-mail also includes e-mail messages automatically transmitted to a user including selected sports scores, weather, and other news information. This type of push technology uses e-mail as its distribution method rather than a specialized client application.

In addition to processing voice calls from traditional wired and wireless phones, communication devices now also communicate with other types of devices such as computers of all form factors, Personal Data Assistants (PDAs) or handheld PCs, Instant Messaging Devices (IMD), etc. Additionally, communication devices have merged the capabilities of cellular telephones, PDAs, IMDs, and computing devices and now provide increasingly sophisticated applications.

An application provides the communication device with the ability to perform a wide variety of tasks including drafting documents, communicating with others, preparing presentations, presenting presentations, creating movies and music, maintaining schedules, etc. An application is a set or instructions that, when executed, cause the communication device to behave in a predetermined manner. The instructions may be written using one or more programming languages, assembly languages, scripting languages, etc. Additionally, add-on modules can be run inside another application. The term "execution" is the process of running an application or the carrying out of the operation called for by an instruction. For the application to execute, the application may be translated into a machine language that the communication device can understand. Alternatively, no translation may be required.

A user executes an application by selecting the application for launch. Launching the application generally requires retrieving the executable from a permanent memory device and copying the executable to a temporary memory device, however in sometimes, such as when XIP memory is used application code can be executed from memory (such as flash memory) without loading the application into a temporary device. The temporary memory device is generally some form of random access memory (RAM). The RAM or system memory holds the operating system and executing applications so that they can be reached quickly by the computer's processor. RAM is much faster to read from and write to than permanent memory devices such as a hard disk, a floppy disk, a CD-ROM, etc. However, the data in RAM is volatile meaning that it remains only as long as the computer is powered on. When the computer is powered off, RAM loses its data. Alternatively, using execute in place, an application stored in read only memory or flash memory may be run directly from the location where it is stored. The execution does not require the program to be copied into RAM before execution.

Communication devices generally are small and lightweight because the desire is for an easily portable device. As a result, the display and the input areas are small and generally more tedious to use. Some devices may have a small keyboard provided, while others provide a pen and touch interface. Use of the pen and touch interface may entail use of an on-screen keyboard such that the user "types" by selecting each letter from the on-screen keyboard with a pen or stylus. Alternatively, a pen and touch interface may entail use of a tablet on which the user "writes." The devices may or may not include a mouse, a track ball, or other buttons to facilitate input to the device. There is a need to reduce the amount of text entry required for text messaging applications in all computing devices because typing can be tedious, dine consuming, and error prone. The need to reduce the amount of text entry is particularly acute when a communication device is used because the size of the device is small and the data entry is more tedious that with full sized devices.

U.S. Pat. No. 6,085,201 describes a context-sensitive template engine that generates a context-sensitive text message corresponding to an input text string. The template engine decomposes the input text string into search words that are then used to search a database of predefined templates to identify a contextually appropriate template based on the input text string. The identified template may then be used to generate a responsive text message. The identified template may include a number of fields that require the user to choose an entry or select an entry using some form of input method such as a scroll button or through typing. Example shortcomings to the described context-sensitive template engine are the need to define an input text string and the requirement to manually fill fields in the template, thus still requiring text entry or some other input from the user.

Some cellular operators provide information services using SMS (e.g. news, sports news, weather forecast, etc.). Using SMS requires that the user remember the form of a message and a phone number to which the message is sent to receive the service. However, it is difficult for a user to remember the required content of the SMS message and the phone number in order to use a specific service. MyInfo, a utility, addresses this problem by allowing a user to define and to arrange SMS services in an easy to use hierarchical list. A user browses through the list, selects a service, and then sends the service request. MyInfo also supports SMS message templates that are preformed messages such that the user manually fills in the context based fields of the message. For example, a template such as "I will call you in [minutes] minutes" prompts the user to enter the [minutes] field of the text message. Thus, there is still a requirement to manually enter some fields in the template.

What is needed, therefore, is a method of automatically filling some or all of the fields of a template based message. What is further needed is a method of creating routine messages that requires fewer text entries, and thus less time, and minimizes syntax errors made by the user.

SUMMARY OF THE INVENTION

Exemplary embodiments of the invention include a method, a computer program product, and a device for automatically providing data for a field in a template. The method, for example, can include executing an application at a device, wherein context data including context data items is associated with the executing application, selecting a messaging technology to send a message from the device, selecting a template for the message, wherein the template comprises one or more dynamic fields, selecting a context data item from the context data associated with the executing application, and inserting the selected context data item in the dynamic field to facilitate the creation of a message.

Other principal features and advantages of the invention will become apparent to those skilled in the art upon review of the following drawings, the detailed description, and the appended claims.

BRIEF DESCRIPTION OF THE DRAWINGS

The exemplary embodiments of the invention will hereafter be described with reference to the accompanying drawings, wherein like numerals will denote like elements.

DETAILED DESCRIPTION OF THE EXEMPLARY EMBODIMENTS

Figure 1:
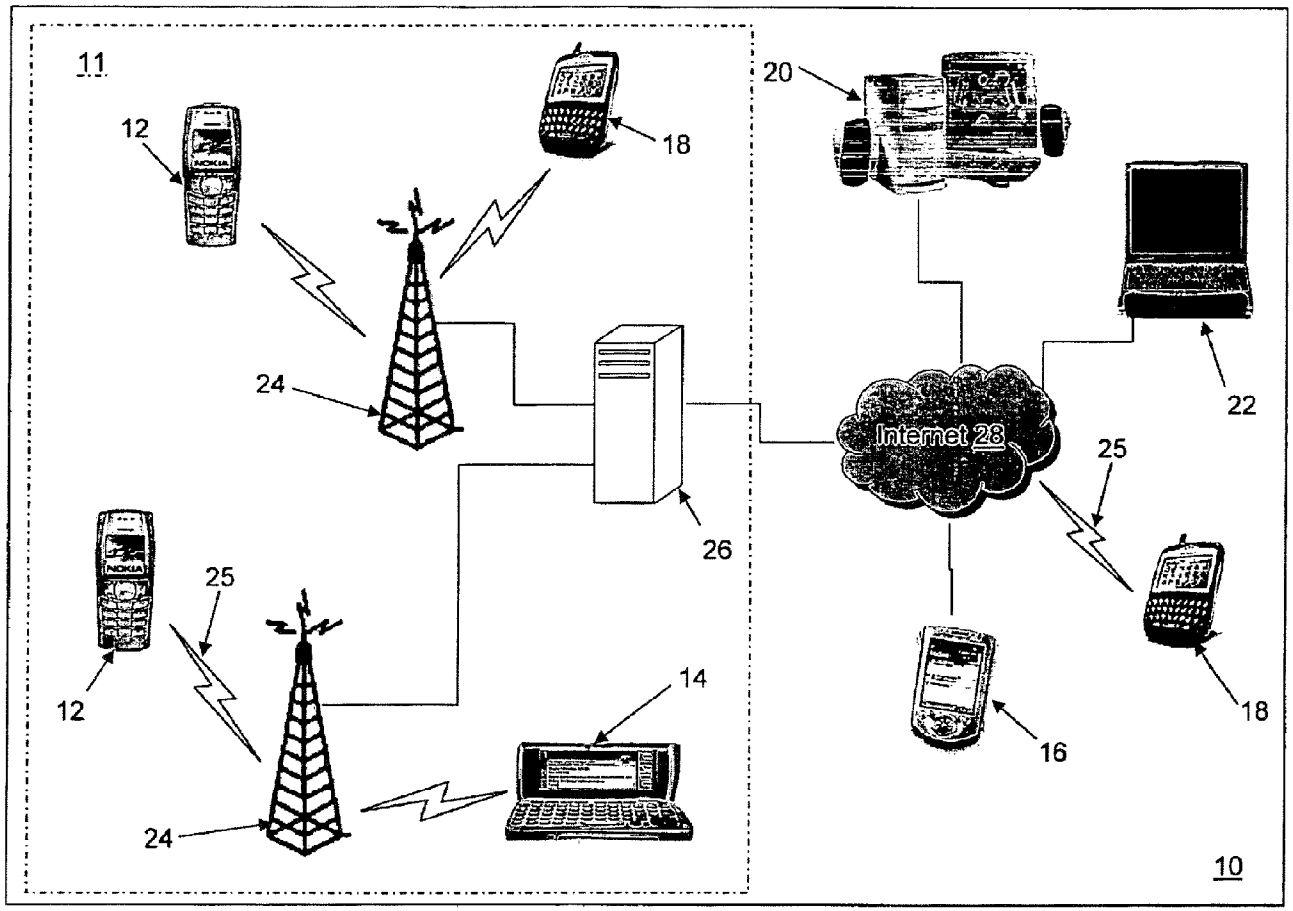
FIG. 1 is an overview diagram of a system in accordance with an exemplary embodiment.

With reference to FIG. 1, the system 10 is comprised of multiple communication devices that can communicate through a network. The system 10 may comprise any combination of wired or wireless networks including a cellular telephone network, a wireless Local Area Network (WLAN), a Bluetooth personal area network, an Ethernet LAN, a token ring LAN, a wide area network, the Internet, etc. The system 10 may include both wired and wireless communication devices. For exemplification, the system 10 shown in FIG. 1 includes a cellular telephone network 11 and the Internet 28. Connectivity to the Internet 28 may include long range wireless connections, short range wireless connections, and various wired connections including telephone lines, cable lines, power lines, combinations of these wired connections, etc.

The exemplary communication devices of system 10 may include a cellular telephone 12, a combination PDA and cellular telephone 14, a PDA 16, an IMD 18, a desktop computer 20, and a notebook computer 22. The communication devices may be stationary or mobile as when carried by an individual who is moving. The communication devices may also be located in a mode of transportation. Some or all of the communication devices may send and receive calls and messages and communicate with service providers through a wireless connection 25 to a base station 24. The base station 24 may be connected to a network server 26 that allows communication between the cellular telephone network 11 and the Internet 28. The system 10 may include additional communication devices and communication devices of different types.

The communication devices may communicate using various transmission technologies including Code Division Multiple Access (CDMA), Global System for Mobile Communications (GSM), Universal Mobile Telecommunications System (UMTS), Time Division Multiple Access (TDMA), Transmission Control Protocol/Internet Protocol (TCP/IP), Bluetooth, IEEE 802.11, infrared, file transfer protocol, etc. The communication devices may communicate using various messaging technologies including Short Messaging Service (SMS), Multimedia Messaging Service (MMS), e-mail, Instant Messaging Service (IMS), facsimile, etc. A communication device may communicate using various media including radio, infrared, laser, cable connection, and the like. Dual-tone multifrequency provides another transmission technology that is used for various control purposes such as remote control of an answering machine. Other transmission and messaging technologies not specifically mentioned herein and/or not yet invented may be used without departing from the spirit and scope of the invention.

Figure 2:
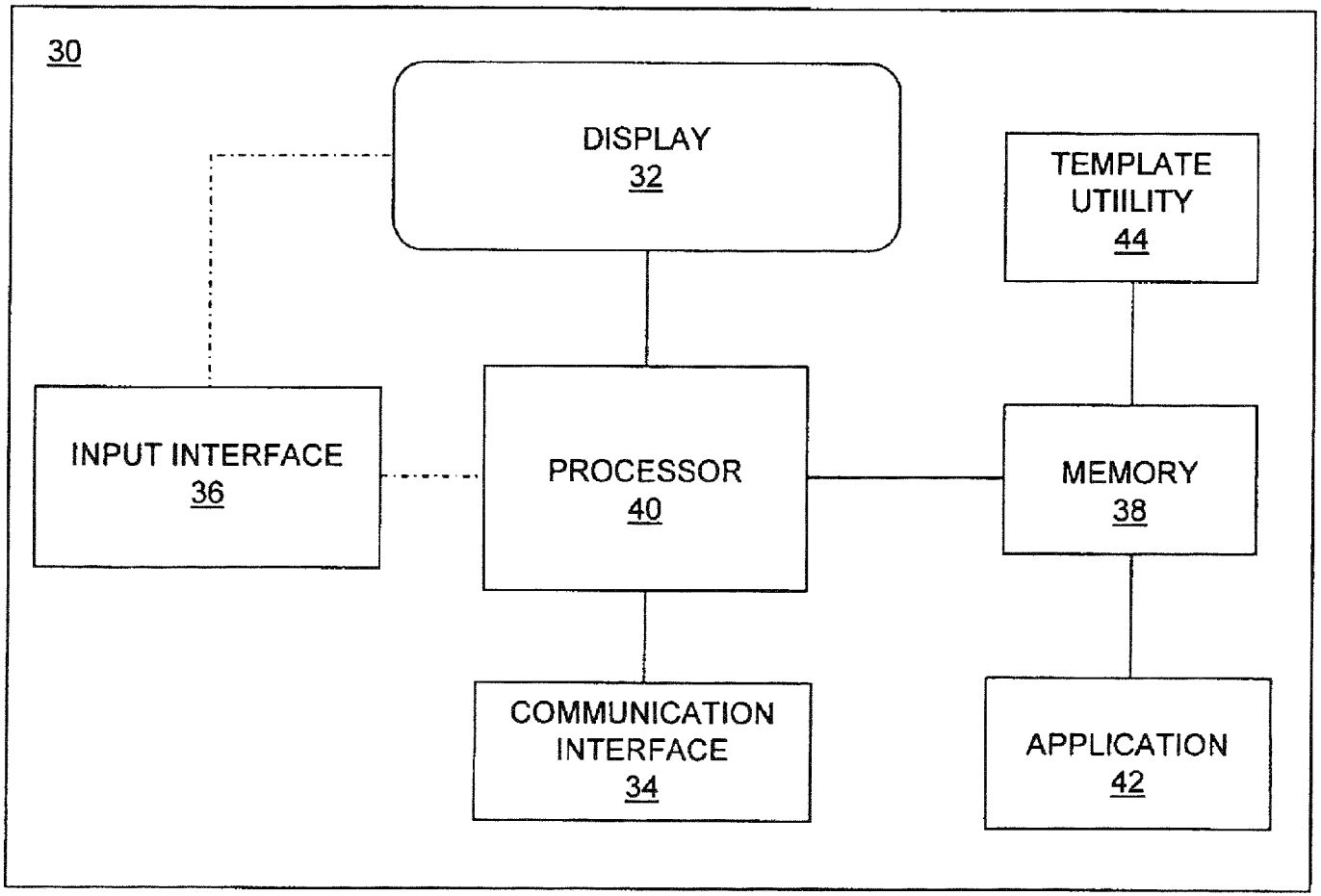
FIG. 2 is a block diagram of a device in accordance with an exemplary embodiment.

A communication device 30 suitable for practicing the invention is shown in FIG. 2. The communication device 30 may include a display 32, a communication interface 34, an input interface 36, a memory 38, a processor 40, an application 42, and a template utility 44. Different and additional components of communication device 30 may be incorporated into the communication device 30 and/or the system 10 as long as the template utility 44 can be implemented in the communication device 30. The display 32 presents information to a user. The communication interface 34 provides an interface for receiving and transmitting calls, messages, and any other information communicable between devices. The input interface 36 provides an interface for receiving information from the user for entry into the device 30. The input interface 36 may provide both an input and output interface.

The memory 38 is the electronic holding place for the operating system, the application 42, other applications, data, and/or the template utility 44 so that the information can be reached by the processor 40. The terminal may have a plurality of memories 38 using different memory technologies including RAM, ROM, flash memory, XIP, a cache, etc.

The application 42 is a set of instructions that, when executed, cause the communication device 30 to perform a function for the user. Similarly, the template utility 44 is a set of instructions. The template utility 44 may also include a database of templates that may be integrated with the template utility 44 or accessible from the template utility 44.

The processor 40 retrieves a set of instructions such as application 42 or template utility 44 from a non-volatile or a permanent memory and copy the instructions in an executable form to a temporary memory. The processor 40 executes an application or a utility, meaning that it performs the operations called for by that instruction set. The processor 40 may be implemented as a special purpose computer, logic circuits, hardware circuits, etc. Thus, the processor 40 may be implemented in hardware, firmware, software, or any combination of these methods.

The application 42, the template utility 44, the operating system, and other applications may be executed by the same processor 40. Alternatively, the application 42, the template utility 44, the operating system, and other applications may be executed by different processors. The application 42, the template utility 44, the operating system, and other applications may be written in the same or different computer languages including high level languages, scripting languages, assembly languages, etc.

A template provides a structural pattern for a message and is used as a starting point for creating the message. Thus, a template is essentially a preformed message. The template includes text that is common to all messages of that type and one or more fields that change from message to message. The one or more fields may be static or dynamic. The static fields are manually filled by the user possibly after prompting the user to type in a value or by providing the user with a set of choices for filling in the field. The dynamic fields are automatically filled by the template utility 44 based on context data associated with the decision to create the message or by execution of a macro that may use the context data if needed. A macro, or a script, is a series of commands that are stored so that the commands can be easily and quickly executed at a later time. For example, a macro can be used to format a document, enter text, and/or execute computer code. Data may be read from a file such as "template.ini" stored locally or in a network. In creating an example message, the date field may automatically be updated when the message is opened, edited, saved, sent, or when an event or set of events relevant to the device, the user, the application being used, or the message itself occurs. Example triggering events are entrance into a different time zone, a cellular network time and date update for the device, a device wakeup in response to a key press, a device entering screensaver or sleep mode, change of access point, seamless roaming, etc. Additional triggering events include: sending/receiving data that relates to, for example, an application being used at the time where the application can be a remote server application such as Lotus Sametime that includes Instant Messaging and peer status, activation/de-activation of a profile or mode of the terminal, security state (or change) of the device/connection (for example, a virtual private network (VPN) connection active and connected to the corporate server as compared to VPN not active, but connected to an 'open' internet server), calendar events active/occurring within a preset time frame, phonebook entries and data associated with them (recipient of the message, recipient contact card, if a photo is available for the recipient, the recipient's employer, if the "company" field says "IBM" then treat in a special way, etc.), received messages by a recipient, messages sent to the recipient during a time frame, etc. The user can edit the fields afterwards if desired.

Figure 3:
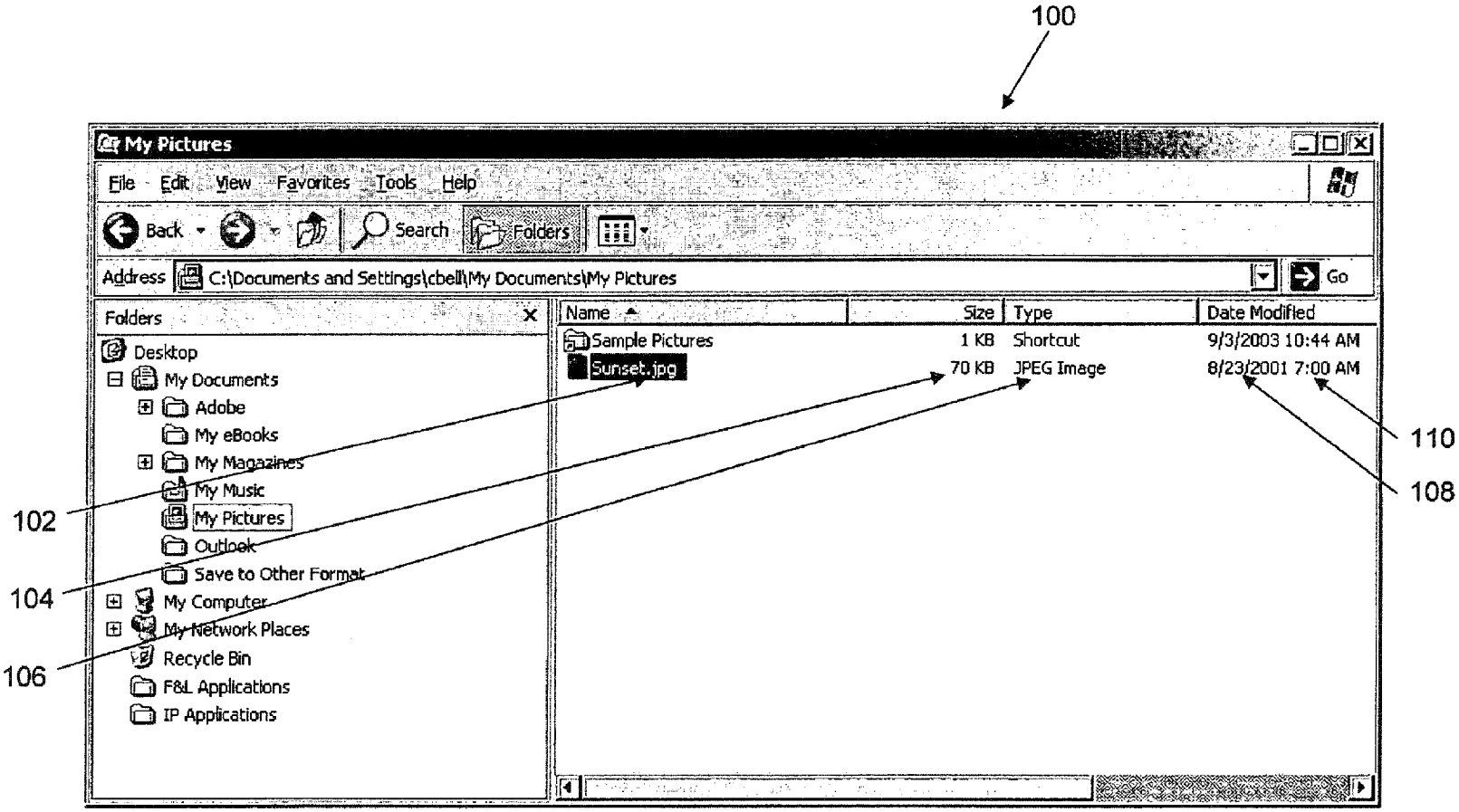
FIG. 3 is a screen capture of a directory file system browser application having context data associated with a file selection.
Figure 4:
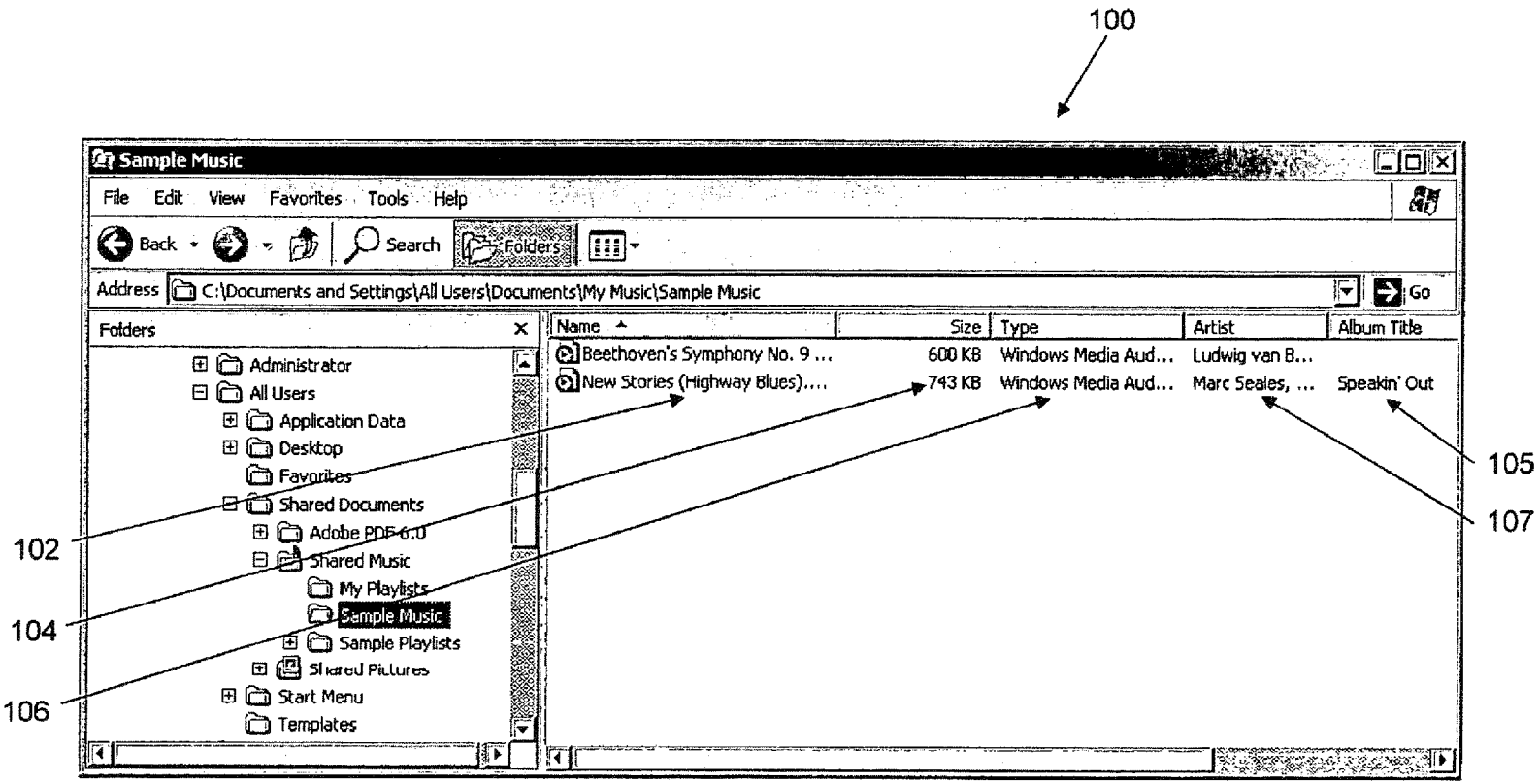
FIG. 4 is a second screen capture of the directory file system browser application having context data associated with a second file selection.

Context data includes any information associated with execution of an application or a selected item in an executing application. Context data may vary based on the application and, possibly, on the item selected within the application. For example, a directory file system browser application 100, such as Windows® Explorer shown in FIG. 3, provides context data relative to a selected file or folder. The context data may include context data items such as a file name 102, a file size 104, a file type 106, a file creation date 108, a file creation time 110, etc. These context data items are associated with use of the Windows® Explorer application generally and specifically with a selected item such as the file "sunset.jpg" highlighted in FIG. 3. Additionally, the file type 106 may be associated with certain applications. For example, a JPEG image file type generally is associated with an image editor/viewer application. Depending on the file type, additional context data may also be provided. For example, as shown in FIG. 4, an audio file type may have additional context data associated with the file such as an artist 107 and an album 105.

Figure 5:
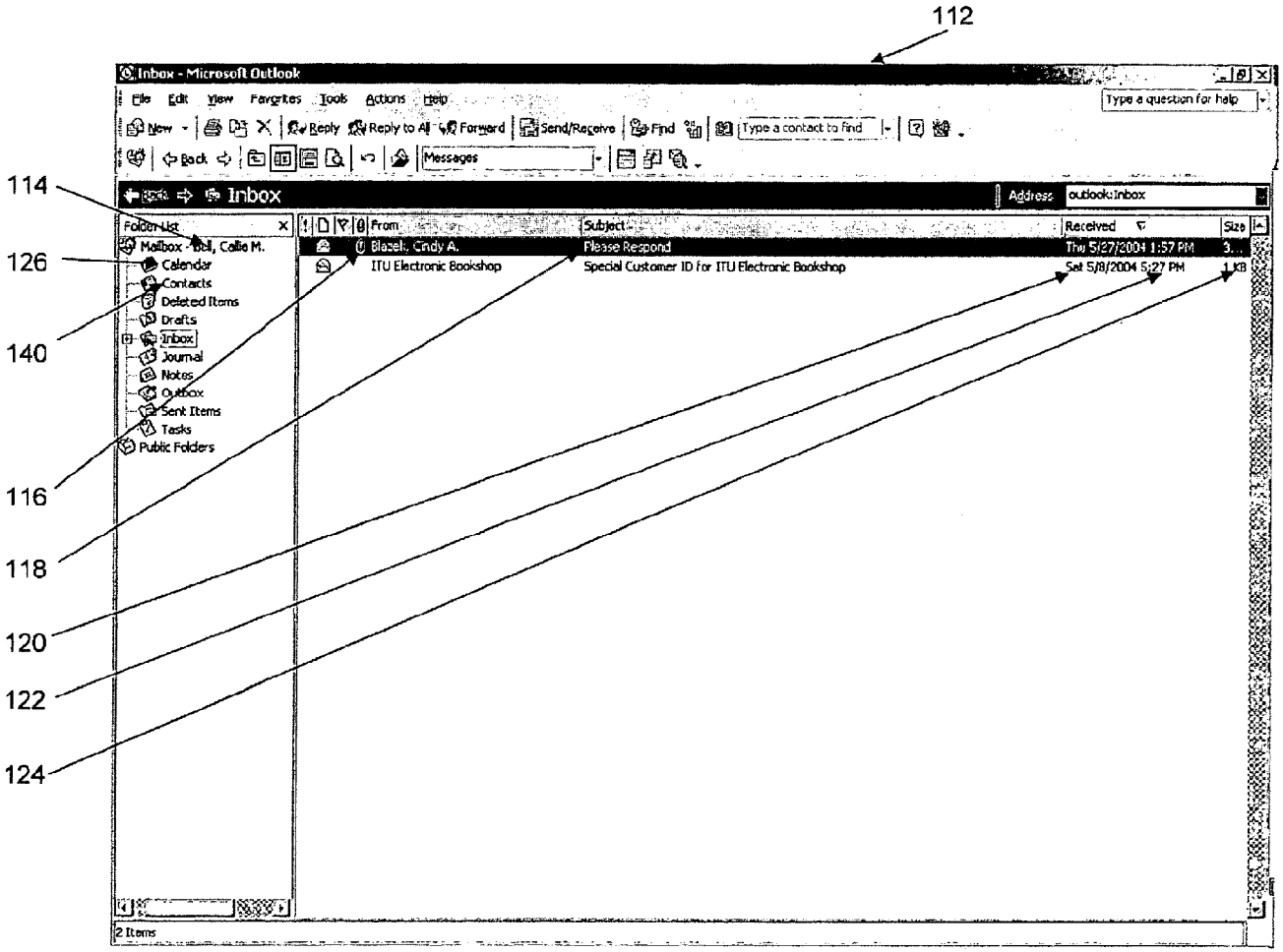
FIG. 5 is a screen capture of a messaging application having context data associated with a message selection.

Another example, as shown in FIG. 5, wherein the application is an e-mail application 112, such as Microsoft® Outlook®, context data may include a sender name 114, a sender phone number, a sender e-mail address, a sender address, a receiver name 116, a receiver phone number, a receiver e-mail address, a receiver address, a message subject 118, a message received date 120, a message received time 122, a message size 124, etc. As shown in FIG. 5, the e-mail application 112 may include a calendar tool 126 and a contact tool 140 integrated into the e-mail application 112. Alternatively, the calendar tool 126 and the contact tool 140 may be independent applications.

Figure 6:
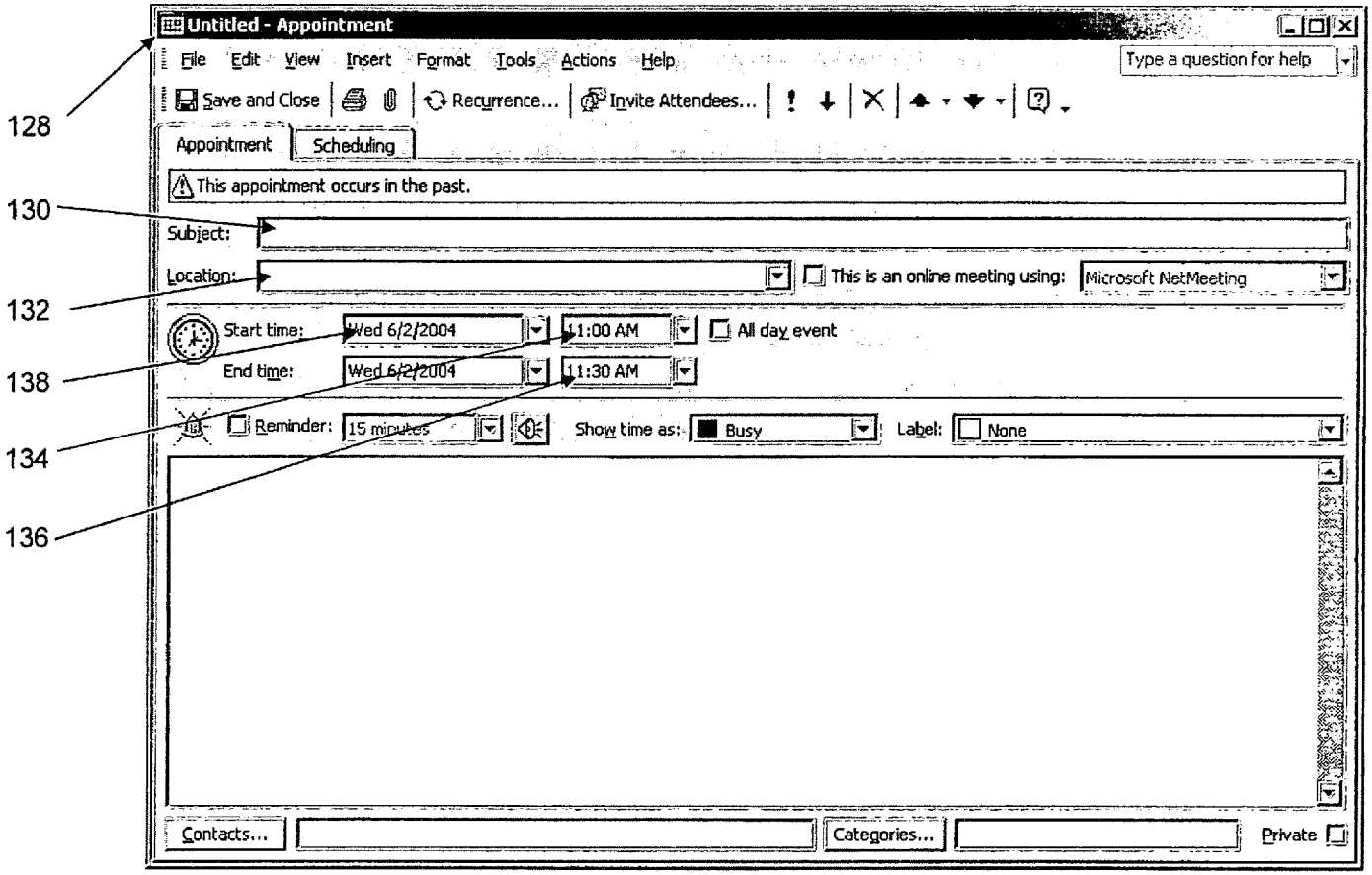
FIG. 6 is a screen capture of a scheduling application having context data associated with an appointment selection.

Selection of the calendar tool 126 may provide additional context data. As shown in FIG. 6, a new calendar entry 128 may include context data such as for example, a calendar entry subject 130, a calendar entry location 132, a calendar entry start time 134, a calendar entry stop time 136, a calendar entry date 138, etc.

Figure 7:
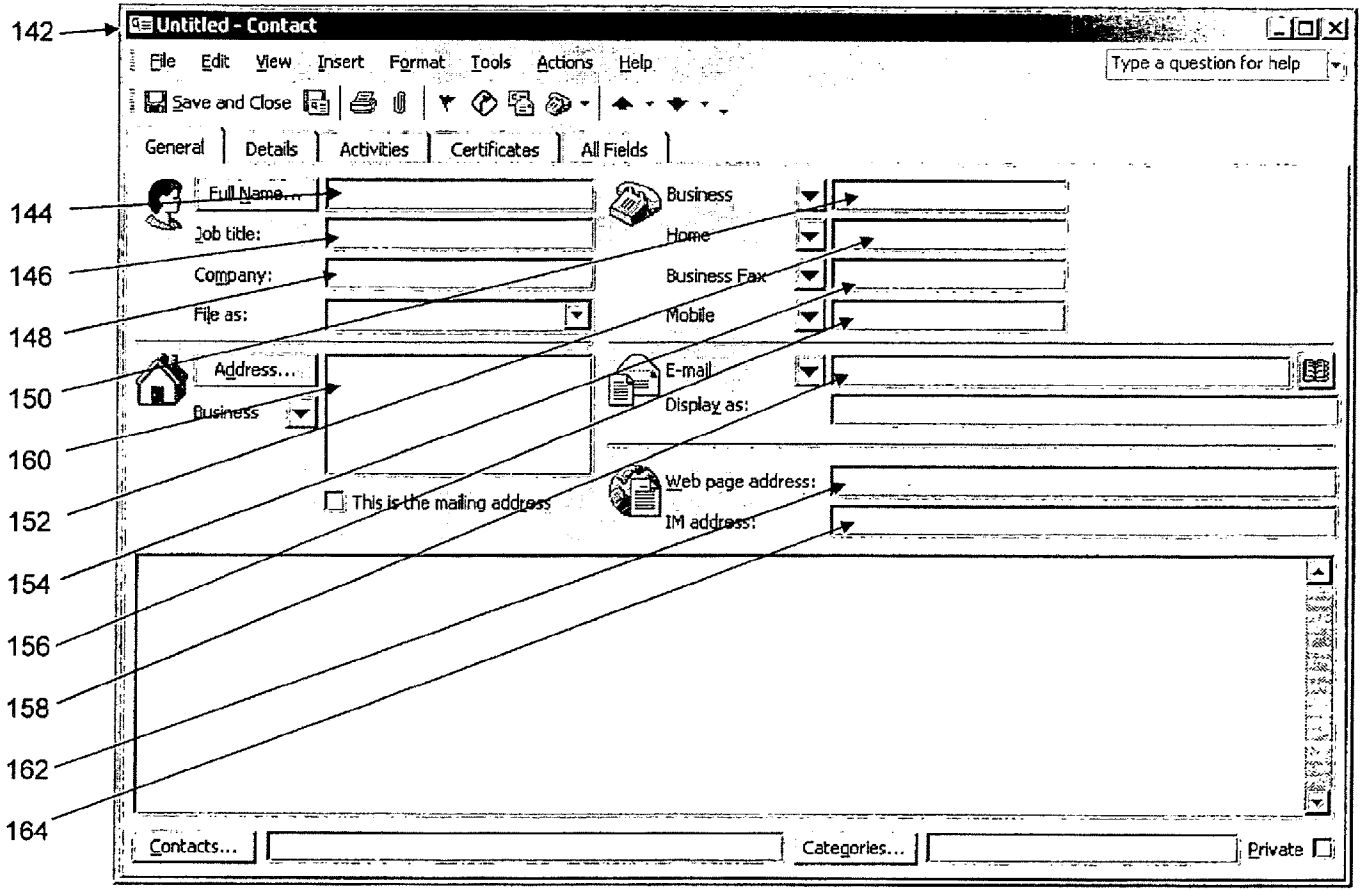
FIG. 7 is a screen capture of a contacts application having context data associated with a contact selection.
Figure 8:
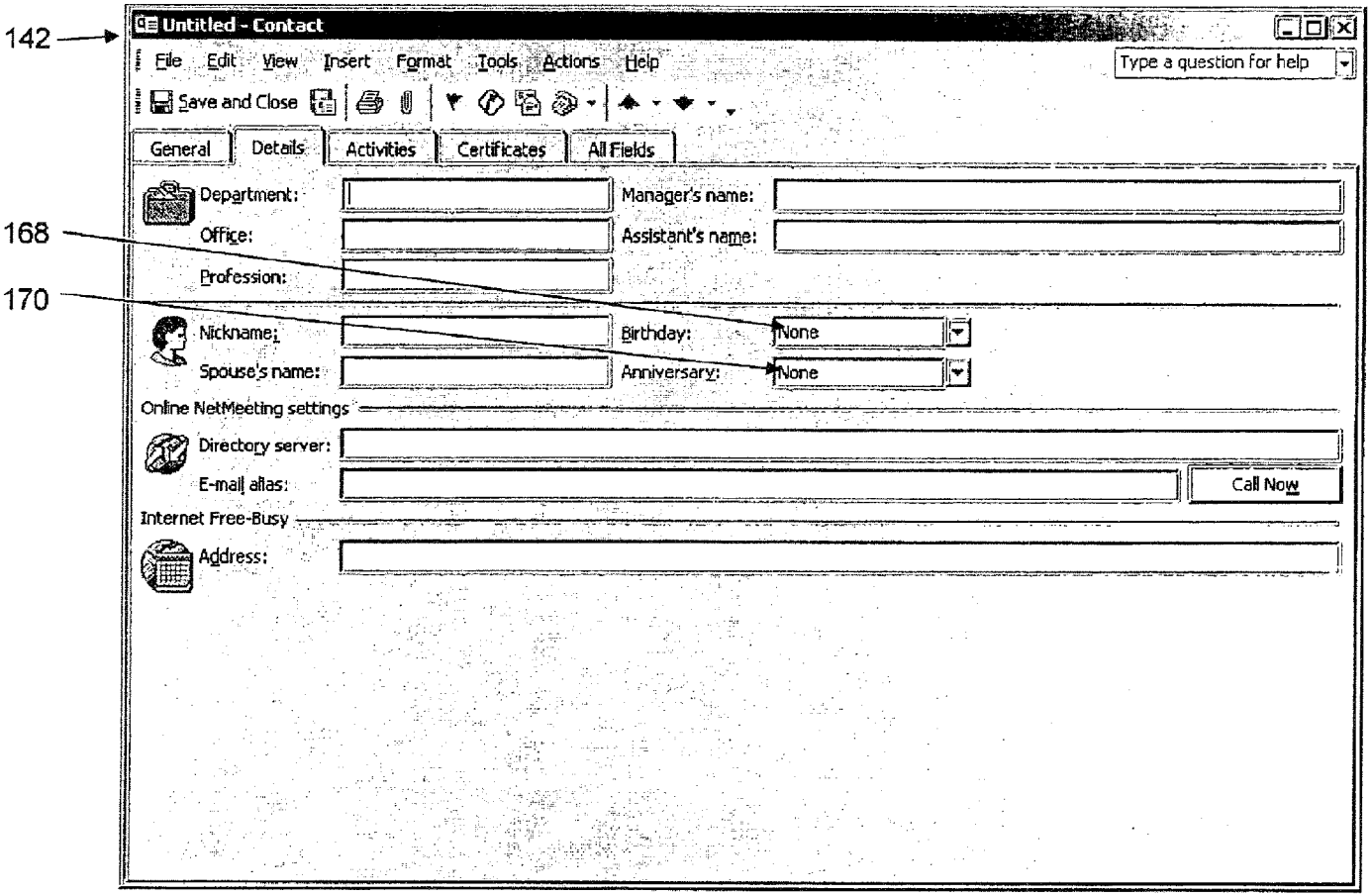
FIG. 8 is a screen capture of a contacts application having additional context data associated with the contact selection.

Selection of the contact tool 140 may provide additional context data. As shown in FIG. 7, a new contact entry 142 may include context data such as for example, a contact name 144, a contact job title name 146, a contact employer name 148, a contact business phone number 150, a contact home phone number 152, a contact facsimile number 154, a contact mobile phone number 156, a contact e-mail address 158, a contact address 160, a contact web address 162, a contact instant messaging address 164, etc. Additional contact entry context data may include a contact birthday 168, a contact anniversary 170, etc. as shown in FIG. 8.

Applications have been developed that allow a request for the current location of a communication device. These applications may, for example, request accurate, real-time positioning of the communication device in order to connect the device user to nearby points of interest, to advise them of current traffic or weather conditions, or to provide routing information. Various methods have been developed for determining the location of the communication device. For example, some communication device may include a Global Positioning System (GPS) as part of the device. The GPS uses satellites to triangulate to the location of the GPS.

Alternatively, other methods utilize a ground based network of antennas or base stations to determine the communication device location. For example, an application might make a request to a wireless carrier network. The wireless carrier would then use one of several methods to determine a user's location on the wireless network and return the latitude and longitude coordinates to the application program. One method involves identifying the cell or base station closest to the mobile terminal. The antenna in communication with the communication device may then be used to determine the relative direction of the communication device. Using the round trip time, the distance from the base station can be determined. Alternatively, the device may receive the information without a request and use it as needed.

Another method using multiple base stations may be used in some circumstances. The location of the communication device can be determined using typically three base stations capable of communicating with the communication device and triangulating the estimated location of the communication device from each individual base station. Thus, context data associated with this type of application includes a device physical location.

In another alternative embodiment, the application can be configured for the creation of documents. In this embodiment, a script or macro can be run to create a type of document, such as a power of attorney agreement. The macro or script can select a power of attorney agreement template that includes fields which can be filled in with context data. For example, the context data may include the user's name, an attorney's name, a date, a place, etc. The fields can be filled in with the context data and the document can be sent, for example, to a printer, as a facsimile, to a non-volatile storage medium, to any other recipient, in any other manner.

Figure 9:
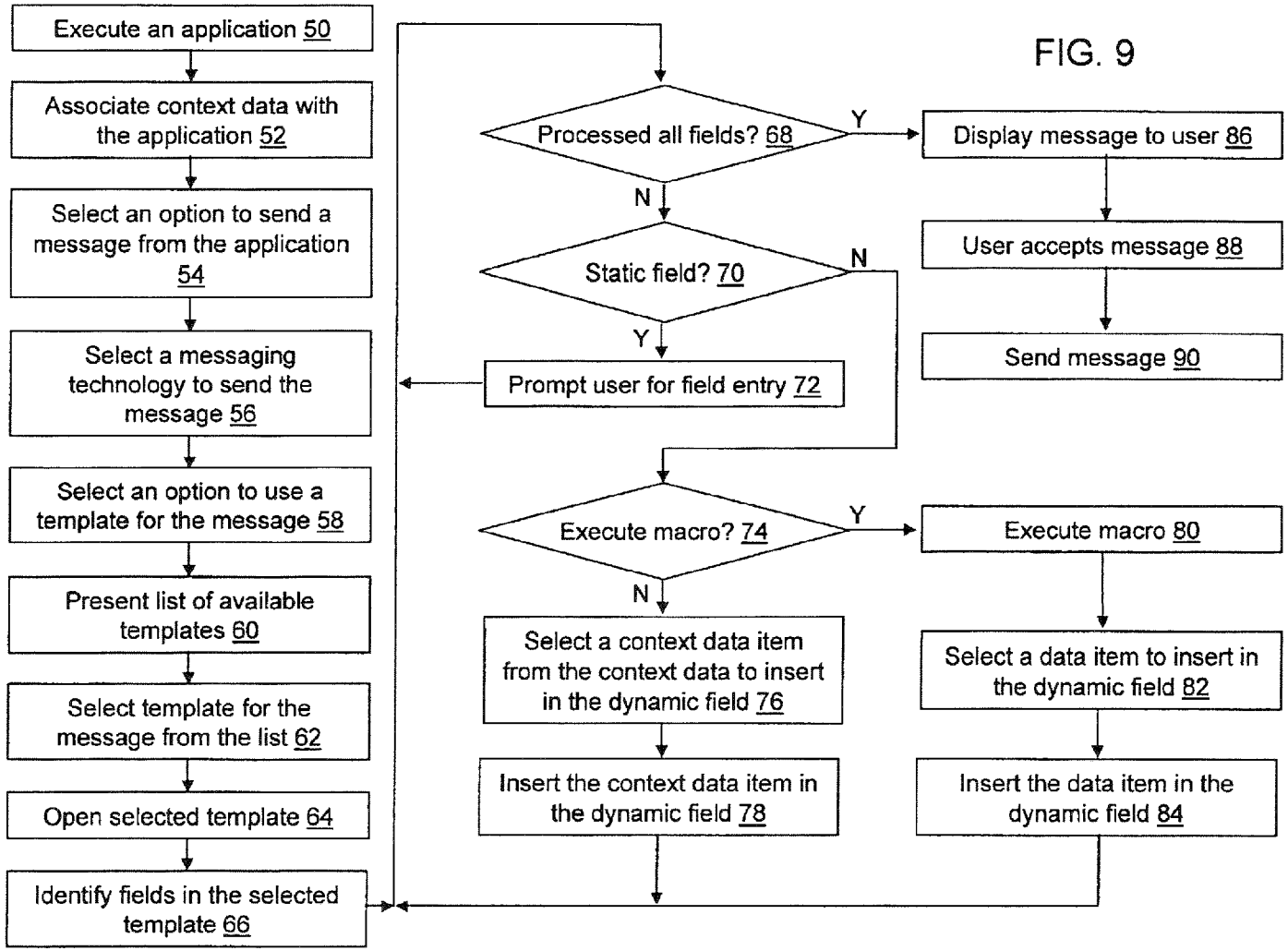
FIG. 9 is a flowchart in accordance with a preferred embodiment.

Use of the described context data provides for the automatic filling of dynamic fields in a template making the creation of messages easier, faster, and having fewer errors, particularly where the communication device is a mobile communication device. FIG. 9 illustrates an operational flow for the automatic filling of dynamic fields in a template using the device 30 that includes the application 42 and the template utility 44 in accordance with a preferred embodiment. In an operation 50, the user of the communication device executes an application. Context data is associated with the application at operation 52. While executing the application at operation 54, the user selects an option to send a message to another communication device from the application. At operation 56, the user selects a messaging technology to send the message to the other communication device.

At operation 58, the user selects an option to use a template in creating the message. The user, at operation 60, is presented with a list of available templates by the template utility 44. The list of available templates may be limited to only those templates that are suitable for the form of communication selected. For example, a selected SMS message would not include templates that have video files. The templates may be included as part of the template utility 44 or in a separate database accessible by the template utility 44. The user selects a template for the message from the template list at operation 62. The template utility 44 opens the selected template at operation 64.

The template comprises one or more fields. The fields may be static or dynamic. At operation 66, the template utility 44 identifies the fields in the selected template. The template utility 44 processes each identified field. The decision at operation 68 determines if all of the identified fields have been processed. The determination at operation 68 considers whether or not the dynamic field can be processed based on the status of the device. For example, if the field requires information from a GPS that is not attached to the device, the field is determined to have been processed. If all of the fields have not been processed, the template utility, at operation 70, determines if the field is a static field. If the field is a static field, the user is prompted to enter data in the field at operation 72 or to make a selection from among a set of choices provided to the user. After the data is entered or the selection is made, processing returns to operation 68 to determine if all of the fields have been processed.

If the field is not determined to be a static field at operation 70, the field is identified as a dynamic field. The decision at operation 74 determines if a macro is executed to fill the dynamic field. If a macro is not used to the fill the dynamic field, at operation 76, a context data item is selected from the context data associated with the application to insert in the dynamic field. At operation 78, the template utility 44 inserts the selected context data item in the dynamic field of the template. After the data is entered, processing returns to operation 68 to determine if all of the fields have been processed.

For example, a user schedules a meeting and wants to send a message to the selected attendees. The template selected by the user from an application may be structured as "Our next meeting is scheduled for <calendar_entry_date> in <calendar_entry_location>. Please bring your papers with you. Sauna is available. The meeting attendees are <message_recipients>. I will see you there. <message_sender>." The brackets "< >" enclose a dynamic field that may be filled using context data associated with the scheduling application. The text string within the brackets "< >" indicates the context data item to select from the associated context data and to insert in the dynamic field.

As another example, using a multimedia message, the user selects an image file to send to friends possibly using a directory file system browser. The template selected by the user may be structured as "This (object) was spotted in <gps_location_name> at <picture_time> on <picture_date>. Greetings, <message_sender>. <picture_file_name>." The brackets "< >" enclose a dynamic field that may be filled using context data associated with the selected image file. The text string within the brackets "< >" indicates the context data item to select from the associated context data and to insert in the dynamic field. The brackets "( )" enclose a static field that may be filled after prompting the user for a text entry or for a selection.

If the decision at operation 74 determines that a macro is executed to fill the dynamic field, the macro is executed at operation 80. The macro may execute commands to select the context data item from the context data. In that example use case, the macro selected data item, at operation 82 is one of the context data items. Alternatively, the macro may select a data item at operation 82 that is not one of the context data items. At operation 84, the data item selected by the macro is inserted in the dynamic field of the template. After the data is entered, processing returns to operation 68 to determine if all of the fields have been processed. An example macro may select a phone number from a missed calls list using the user defined "Missed Phone Number Search" macro. The macro could select the number that is inserted in the selected message template dynamic field.

For example, using a multimedia message, the user selects a surveillance camera application to take a picture. The user wants to send the picture to a server computer for storage. The template selected by the user may be structured as "[Insert command to server], (time tag):<picture_time>, <picture_date>, (location tag):<gps_location_coordinates>. <picture_file_name>." The brackets "< >" enclose a dynamic field that may be filled using context data associated with the selected picture file. The text string within the brackets "< >" indicates the context data item to select from the associated context data and to insert in the dynamic field. The brackets "( )" enclose a static field that may be filled after prompting the user for a text entry or allowing the user to select from a set of displayed choices. The brackets "[ ]" enclose a macro that is executed to select the data item to insert in the dynamic field. The text string within the brackets "[ ]" indicates the macro name. In this example use case, the macro does not select the data item from the context data.

In various embodiments of the invention, a more generic editor may be provided which allows the user to create a generic message and decide later which messaging technology to use for sending the message. For example, a generic message may be created and saved for later editing or sending. In one embodiment, the editor may allow the user to create either an SMS message or a multimedia message. The user can then, after creating the message, decide whether to send the message as an SMS or a multimedia message.

As another example use case, a user is a businessperson who travels frequently and is currently at London's Heathrow airport. The user logs into a WLAN with his communicator, starts browsing the web. He finds a website having a product about which he would like to tell his friends about. The user selects SEND AS, chooses SMS, selects SPECIAL BARGAIN WEB PAGE SMS template, with the fields: web url, item, location, etc. The information is automatically processed from the web browser to the dynamic fields in the selected template.

The decision at operation 68 determines if the identified fields have been processed to the extent possible. If all of the fields have been processed, the template utility, at operation 86, may display the message including the filled static and dynamic fields to the user. Alternatively, the template utility 44 may automatically send the message using the selected messaging technology without displaying the message to the user. At operation 88, the user may accept or approve the message. In addition, the user may be allowed to fill in fields that were processed by no data was entered, for example, when an accessory is not available to provide data. The message is sent using the messaging technology to the message recipient at operation 90. For example, using the example template "This (object) was spotted in <gps_location_name> at <picture_time> on <picture_date>. Greetings, <message_sender>. <picture_file_name>." the message may be "This Robin was spotted in Tampere, Finland at 10:14 AM on Thurs Apr. 3, 2004. Greetings, Peter. Robin.jpg."

It is understood that the invention is not confined to the particular embodiments set forth herein as illustrative, but embraces all such modifications, combinations, and permutations as come within the scope of the following claims. Thus, the description of the preferred embodiments is for purposes of illustration and not limitation.

What is claimed is:

1. A method comprising:

executing an application at a device, wherein *message* context data including *message* context data items is associated with the executing application;

[selecting a messaging technology to send a message from the device;

selecting a template for the message, wherein the template comprises a dynamic field;]

selecting a *selected message* context data item from the *message* context data associated with the executing application; and automatically inserting the selected *message* context data item in [the] *a* dynamic field *of a template* to facilitate the creation of a message *to send from the device*.

2. The method of claim 1, further comprising sending the message to [a] *the* device using [the selected] *a* messaging technology.

3. The method of claim 2, wherein sending the message to [a] *the* device uses a transmission technology selected from the group consisting of transmission control protocol, internet protocol, Bluetooth, IEEE 802.11, file transfer protocol, dual-tone multifrequency, and infrared.

4. The method of claim 1, further comprising determining if a field *in the template* is [a] *the* dynamic field.

5. The method of claim 4, further comprising, if the field *in the template* is [a] *the* dynamic field, determining if the *message* context data item is available, and if the *message* context data item is available, selecting the *message* context data item.

6. The method of claim [1] *5*, wherein [selecting the template is performed based on the executing application] *the dynamic field includes a data indicator configured to indicate a type of message context data to select*.

7. The method of claim 1, wherein selecting a *selected message* context data item comprises executing a macro, wherein the macro selects the *selected message* context data item to insert in the dynamic field.

8. The method of claim 1, [further comprising executing a macro, wherein the macro is inserted in the dynamic field] *wherein the dynamic field includes an indicator of the macro to be executed*.

9. The method of claim 1, wherein the template comprises a plurality of dynamic fields, and the method further comprises selecting a dynamic field from the plurality of dynamic fields, wherein the selected *message* context data item is inserted into the selected dynamic field.

10. The method of claim 1, wherein the device is a mobile communications device.

11. [A computer program product embodied on a] *An apparatus comprising a* computer readable [medium] *memory device storing instructions configured to cause a processing device to perform operations* comprising:

[computer code configured to: execute] *executing* an application, wherein *message* context data including *message* context data items is associated with the executing application;

[select a messaging technology to send a message;

select a template for the message, wherein the template comprises a dynamic field; select] *selecting* a *selected message* context data item from the *message* context data associated with the executing application; and automatically [insert] *inserting* the selected *message* context data item in [the] *a* dynamic field *of a template* to facilitate the creation of a message *to send from the apparatus*.

12. The [computer program product] *apparatus* of claim 11, wherein the [computer code configured to select a] *selecting of the selected message* context data item comprises [computer code configured to execute] *executing* a macro, wherein the macro selects the *selected message* context data item to insert in the dynamic field.

13. The [computer program product] *apparatus* of claim 11, wherein the [computer code] *processing device* is further configured to allow acceptance of the message with the selected *message* context data item.

14. The [computer program product] *apparatus* of claim 11, wherein the template comprises a plurality of dynamic fields, and the [computer code] *processing device* is further configured to select a *selected* dynamic field from the plurality of dynamic fields and to insert the selected *message* context data item into the selected dynamic field.

15. A device comprising:

*a memory configured to store computer code; and*

*a processor, in response to execution of the* computer code, configured [to select a template for a message, wherein the template comprises a dynamic field;] to select a *selected message* context data item from *message* context data associated with [an executing application;] *the executing computer code* and to automatically insert the selected *message* context data item in [the] *a* dynamic field *of a template* to facilitate the creation of a message[; a memory, wherein the memory stores the computer code; and a processor coupled to the memory, wherein the processor executes the computer code].

16. The device of claim 15, *wherein the processor is* further [comprising computer code] configured to determine if a field *in the template* is [a] *the* dynamic field.

17. The device of claim 16, *wherein the processor is* further [comprising computer code] configured to[, if the field is a dynamic field, determining] *determine* if the *selected message* context data item is available *when the field in the template is the dynamic field*, and [if the context data item is available, selecting] *configured to select* the *selected message* context data item *when the selected message context data item is available*.

18. The device of claim [16] *17*, wherein [selecting the template is performed based on an executing application] *the dynamic field includes a data indicator configured to indicate a type of message context data for the processor to select*.

19. The method of claim 1, wherein the *message* context data comprises at least Global Positioning Satellite (GPS) location information.

20. The device of claim 15, wherein the *message* context data comprises at least GPS location information.

21. The [computer program product] *apparatus* of claim 11, wherein the *message* context data comprises at least GPS location information.

*22. A method comprising:*

*determining, by a processing device, a message to be generated from a message template;*

*automatically populating, by the processing device, a dynamic field of the message template with message context data in response to the determination; and*

*sending, by the processing device, the message having the message context data in the dynamic field of the message template to a remote device.*

*23. The method of claim 22, wherein automatically populating the dynamic field of the message template with message context data further comprises identifying the message template includes a fillable field, and determining the fillable field is the dynamic field of the message template.*

*24. The method of claim 23, wherein determining the fillable field is the dynamic field of the message template further comprises determining whether the fillable field is a static field and identifying the fillable field is the dynamic field when the fillable field is determined to not be the static field.*

*25. The method of claim 22, wherein automatically populating the dynamic field of the message template with message context data further comprises selecting the message context data based, at least in part, on a data indicator associated with the dynamic field.*

*26. The method of claim 25, wherein the dynamic field includes the data indicator is configured to indicate a type of message context data for the processing device to select.*

*27. The method of claim 22, wherein automatically populating the dynamic field of the message template with message context data further comprises executing, by the processing device, a macro configured to select the message context data to populate in the dynamic field.*

*28. The method of claim 27, wherein the dynamic field includes an indicator of the macro for the processing device to execute.*

*29. The method of claim 22 further comprising:*

*prompting, by the processing device, display of the message template having the populated dynamic field and one or more fillable static fields; and*

*prompting, by the processing device, a user for entry in the one or more fillable static fields.*

*30. The method of claim 22 wherein sending the message utilizes a transmission control protocol, an internet protocol, Bluetooth protocol, IEEE 802.11 protocol, a file transfer protocol, a dual-tone multifrequency protocol, or infrared transmission protocol.*

*31. The method of claim 22, wherein the message context data comprises at least Global Positioning Satellite (GPS) location information.*

*32. An apparatus comprising a computer readable memory device storing instructions configured to cause a processing device to perform operations comprising:*

*determining a message to be generated from a message template;*

*automatically populating a dynamic field of the message template with message context data in response to the determination; and*

*sending the message having the message context data in the dynamic field of the message template to a remote device.*

*33. The apparatus of claim 32, wherein the instructions are further configured to cause the processing device to perform operations comprising identifying that the message template includes a fillable field, and determining the fillable field is the dynamic field of the message template.*

*34. The apparatus of claim 33, wherein the instructions are further configured to cause the processing device to perform operations comprising determining whether the fillable field is a static field and identifying the fillable field is the dynamic field when the fillable field is determined to not be the static field.*

*35. The apparatus of claim 32, wherein the instructions are further configured to cause the processing device to perform operations comprising selecting the message context data based, at least in part, on a data indicator associated with the dynamic field.*

*36. The apparatus of claim 35, wherein the dynamic field includes the data indicator is configured to indicate a type of message context data for the processing device to select.*

*37. The apparatus of claim 32, wherein the instructions are further configured to cause the processing device to perform*

*operations comprising executing a macro configured to select the message context data to populate in the dynamic field.*

*38. The apparatus of claim 37, wherein the dynamic field includes an indicator of the macro for the processing device to execute.*

*39. The apparatus of claim 32 wherein the instructions are further configured to cause the processing device to perform operations comprising:*

*prompting display of the message template having the populated dynamic field and one or more fillable static fields; and*

*prompting a user for an entry in the one or more fillable static fields.*

*40. The apparatus of claim 32, wherein the message context data comprises at least Global Positioning Satellite (GPS) location information.*

* * * * *